US008121339B2

(12) United States Patent
Meaney (10) Patent No.: US 8,121,339 B2
(45) Date of Patent: Feb. 21, 2012

(54) ADAPTIVE MARK PLACEMENT (75) Inventor: Charles Patrick Meaney, Chatswood (AU)

(73) Assignee: Canon Kabushiki Kaisha, Tokyo (JP)

( * ) Notice: Subject to any disclaimer, the term of this patent is extended or adjusted under 35 U.S.C. 154(b) by 1011 days.

(21) Appl. No.: 11/470,031

(22) Filed: Sep. 5, 2006

(65) Prior Publication Data

US 2007/0064973 A1 Mar. 22, 2007

(30) Foreign Application Priority Data

Sep. 13, 2005 (AU) ................................ 2005209707

(51) Int. Cl.
*G06K 9/00* (2006.01)

(52) U.S. Cl. ...................................................... 382/100

(58) Field of Classification Search .................. 382/100, 382/181, 189, 190, 195, 209, 220, 224, 227, 382/282, 305; 395/326, 606, 348; 715/205, 715/723, 762; 725/105; 707/3, 6; 345/156, 345/30; 354/410

See application file for complete search history.

(56) References Cited

U.S. PATENT DOCUMENTS

| 5,436,974 | A | | 7/1995 | Kovanen |
|---|---|---|---|---|
| 5,752,152 | A | | 5/1998 | Gasper et al. |
| 5,798,894 | A | | 8/1998 | Takeushi |
| 5,869,828 | A | * | 2/1999 | Braginsky ..................... 235/469 |
| 5,982,956 | A | | 11/1999 | Lahmi |
| 6,072,871 | A | | 6/2000 | Ur |
| 6,222,932 | B1 | | 4/2001 | Rao et al. |
| 6,289,125 | B1 | | 9/2001 | Katoh et al. |
| 6,580,804 | B1 | * | 6/2003 | Abe ............................... 382/100 |
| 6,580,820 | B1 | | 6/2003 | Fan |
| 6,740,875 | B1 | * | 5/2004 | Ishikawa et al. .............. 250/302 |
| 6,763,122 | B1 | * | 7/2004 | Rodriguez et al. ............ 382/100 |
| 6,870,958 | B2 | | 3/2005 | Murakawa et al. |
| 6,954,542 | B2 | | 10/2005 | Miyake et al. |
| 7,006,247 | B1 | | 2/2006 | Sekine et al. |
| 7,039,215 | B2 | | 5/2006 | Suzaki |
| 7,085,399 | B2 | | 8/2006 | Suzaki |
| 7,089,504 | B1 | * | 8/2006 | Froloff .......................... 715/839 |
| 7,240,209 | B2 | * | 7/2007 | Carro ............................ 713/179 |
| 2002/0071593 | A1 | * | 6/2002 | Muratani ....................... 382/100 |
| 2002/0095577 | A1 | | 7/2002 | Nakamura et al. |
| 2002/0120849 | A1 | * | 8/2002 | McKinley et al. ............ 713/176 |
| 2003/0039376 | A1 | * | 2/2003 | Stach ............................ 382/100 |
| 2003/0128861 | A1 | * | 7/2003 | Rhoads ........................ 382/100 |
| 2003/0210803 | A1 | * | 11/2003 | Kaneda et al. ................ 382/100 |
| 2003/0218777 | A1 | | 11/2003 | Severens |
| 2004/0039913 | A1 | | 2/2004 | Kruse |
| 2004/0091132 | A1 | * | 5/2004 | Eguchi et al. ................. 382/100 |

(Continued)

FOREIGN PATENT DOCUMENTS

CN 1338087 A 2/2002

(Continued)

*Primary Examiner* — Bhavesh Mehta
*Assistant Examiner* — Tahmina Ansari
(74) *Attorney, Agent, or Firm* — Fitzpatrick, Cella, Harper & Scinto (57) ABSTRACT

A method of encoding a message into a document containing known information is disclosed. The method comprises identifying (1502) a plurality of logical information content categories associated with the known information, establishing (1503) a priority order in which said message is to be added to each of the categories, determining (1504) an amount of said message to be added to each of the categories, and encoding (1506) the message into the document according to the established priority order and the determined amount.

23 Claims, 11 Drawing Sheets

U.S. PATENT DOCUMENTS

| | | | |
|---|---|---|---|
| 2004/0114813 A1 | 6/2004 | Boliek et al. | |
| 2004/0151244 A1* | 8/2004 | Kim et al. | 375/240.03 |
| 2005/0025333 A1* | 2/2005 | Fujii et al. | 382/100 |
| 2005/0041263 A1 | 2/2005 | Ishikawa et al. | |
| 2005/0105763 A1* | 5/2005 | Lee et al. | 382/100 |
| 2006/0072782 A1* | 4/2006 | Abe et al. | 382/100 |
| 2008/0089552 A1* | 4/2008 | Nakamura et al. | 382/100 |
| 2008/0205699 A1* | 8/2008 | Kuraki et al. | 382/100 |
| 2008/0273741 A1* | 11/2008 | Fujii et al. | 382/100 |
| 2008/0292129 A1* | 11/2008 | Fan et al. | 382/100 |

FOREIGN PATENT DOCUMENTS

| | | |
|---|---|---|
| CN | 1450495 A | 10/2003 |
| EP | 1 349 370 | 10/2003 |
| EP | 1 781 011 | 3/2007 |
| JP | 6-268859 | 9/1994 |
| JP | 9-154007 | 6/1997 |
| JP | 11-003390 | 1/1999 |
| JP | 2000-287063 | 10/2000 |
| JP | 2001-157032 | 6/2001 |
| JP | 2002-27236 | 1/2002 |
| JP | 2002-354239 | 12/2002 |
| JP | 2003-101762 | 4/2003 |
| JP | 2004-282356 | 10/2004 |
| WO | WO 01/39121 | 5/2001 |
| WO | WO 01/99095 | 12/2001 |
| WO | WO 2005/079072 * | 8/2005 |

* cited by examiner

Fig. 15

ADAPTIVE MARK PLACEMENT

CROSS-REFERENCE TO RELATED PATENT APPLICATION

This application claims the right of priority under 35 U.S.C. §119 based on Australian Patent Application No. 2005209707, filed 13 Sep. 2006, which is incorporated by reference herein in its entirety as if fully set forth herein.

FIELD OF THE INVENTION

The current invention generally relates to steganographically storing data onto printed documents by superimposing symbols in the form of marks onto the document. Steganography refers to hiding a secret message within another message.

BACKGROUND

Keeping track of printed documents where additional data, such as date of printing or copying, is steganographically stored within the printed document is an ongoing area of investigation. For a technique to be applicable to a greater number of applications, it is further desired that the technique is performed without affecting the visible quality of the original document along with the conflicting goal of being able to recover the additional data even from subsequent photocopies of the document.

Existing techniques which encode additional data onto printed matter superimpose a pattern of marks, typically dots, which contains the additional data, onto the printed matter. However, superimposing a pattern containing additional data over the entire original printed matter has many disadvantages. Some of these include substantial degradation of the quality of the document as well as difficulty in identifying dots within images due to little or no contrast between the dot and the region of the printed matter surrounding the location where the dot was placed. The situation worsens greatly when photocopies are made.

Other existing techniques encode additional data onto a page of printed matter selectively by identifying allowable encoding locations in the printed matter, usually the blank spaces near text, and place encoding dots at these locations. Although this avoids the problem of degradation of quality by encoding the additional data in selected locations on the printed matter, it will only work when there is sufficient white space in the printed matter.

Both modes of encoding additional data onto a page of printed matter have their limitations.

SUMMARY

It is an object of the present invention to substantially overcome, or at least ameliorate, one or more disadvantages of existing arrangements.

Disclosed are arrangements, referred to as adaptive mark methods, or techniques using adaptive marks, which seek to address the above problems by performing the encoding according to prioritisation of logical content regions of the document, and by use of adaptive marks which provide good local contrast for subsequent decoding.

According to a first aspect of the present invention, there is provided a method of encoding a message into a document containing known information, the method comprising the steps of:

identifying a plurality of logical information content categories associated with the known information;

establishing a priority order in which said message is to be added to each of the categories;

determining an amount of said message to be added to each of the categories; and encoding the message into the document according to the priority order of the establishing step and the amount of the determining step.

According to another aspect of the present invention, there is provided an apparatus for encoding a message into a document containing known information, the apparatus comprising:

a memory for storing a program; and a processor for executing the program, said program comprising:

code for identifying a plurality of logical information content categories associated with the known information;

code for establishing a priority order in which said message is to be added to each of the categories;

code for determining an amount of said message to be added to each of the categories according; and code for encoding the message into the document according to the established priority order and the determined amount.

According to another aspect of the present invention, there is provided a computer program product including a computer readable medium having recorded thereon a computer program for directing a processor to execute a method for encoding a message into a document containing known information, said program comprising:

code for identifying a plurality of logical information content categories associated with the known information;

code for establishing a priority order in which said message is to be added to each of the categories;

code for determining an amount of said message to be added to each of the categories according; and code for encoding the message into the document according to the established priority order and the determined amount.

According to another aspect of the present invention, there is provided a method of adaptively choosing encoding marks to superimpose onto the face of a document, the method comprising the steps of:

(a) determining the nature of the digital image representation of the original document in the vicinity of where the mark is to be placed; and (b) judging which type of mark to superimpose from a set of predefined marks based on information obtained from (a).

According to another aspect of the present invention, there is provided a method of deciding whether an encoding mark is superimposed onto the face of a document the method comprising the steps of:

(a) obtaining metadata about the logical content present in the printed matter of the document at the location where the mark is to be placed; and (b) superimposing the mark onto the document if the logical content at the location where the mark is to be placed is of the type which is intended to be superimposed with encoding marks.

Other aspects of the invention are also disclosed.

BRIEF DESCRIPTION OF THE DRAWINGS

One or more embodiments of the present invention will now be described with reference to the drawings and appendices, in which.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

From a terminology perspective, the term "document" refers to a medium upon which information is written, and includes commonly referred to documents, printed or electronic, images, multimedia images including printed material, graphic material and the like. The terms "adaptive mark" and "mark" are used interchangeably unless the contrary intention is made clear from the context.

As noted, the current invention generally relates to steganographically storing data onto printed documents by superimposing symbols in the form of marks onto the document. From a terminology perspective, the secret message to be added to the document is referred to simply as a message, or as steganographic information, and the information that is on the document prior to addition of the steganographic information is referred to as "known information".

Figure 1:
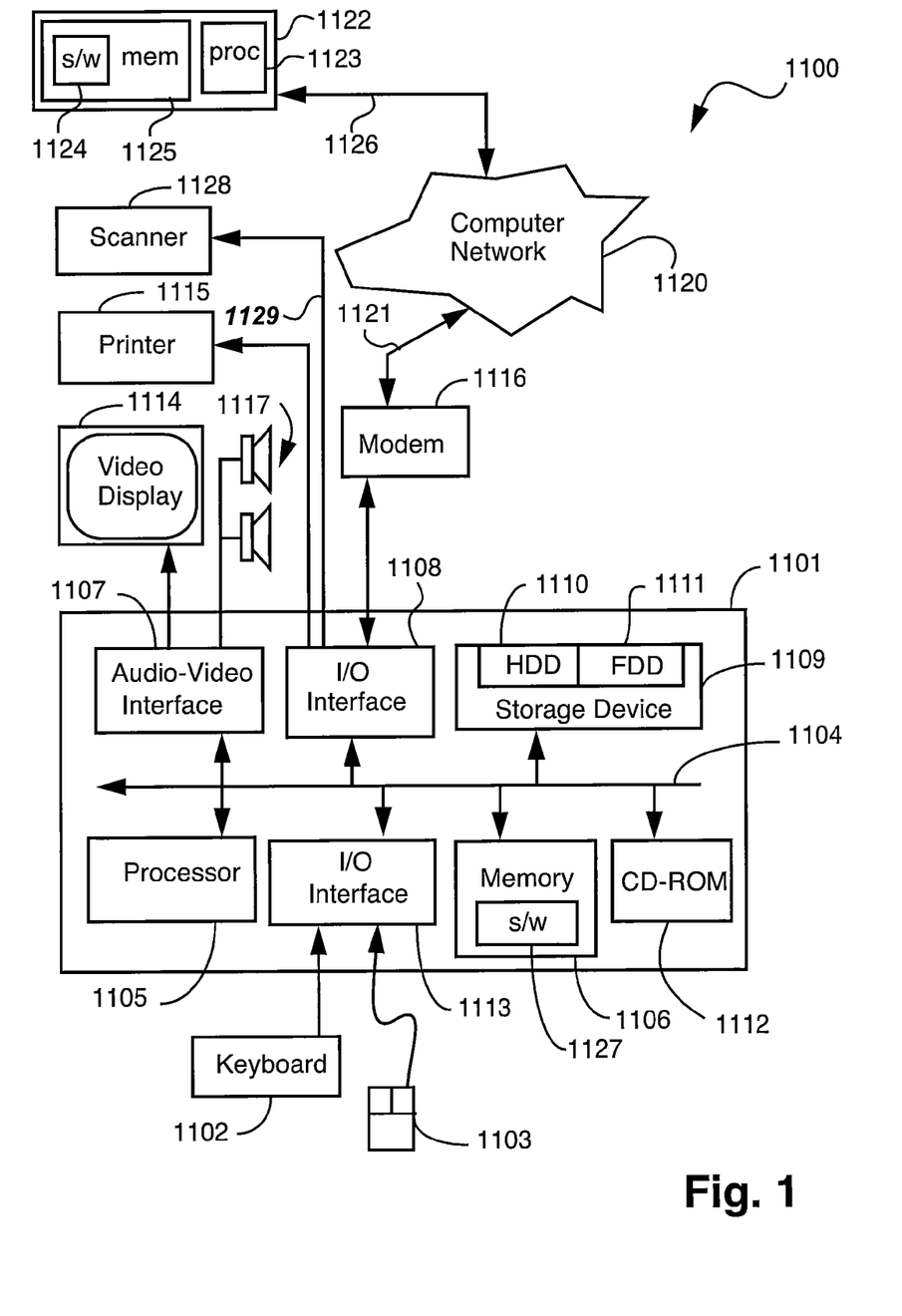
FIG. 1 is a functional block diagram of a general-purpose computer upon which described adaptive mark methods can be practiced.

FIG. 1 is a functional block diagram of a general-purpose computer system 1100 upon which described adaptive mark method can be practiced. The processes of FIGS. 2A, 3 and 9 may be implemented as software, such as an application program executing within the computer system 1100. In particular, the steps of adaptive marking are effected by instructions in software (such as 1127 and or 1124) that are carried out by respective computers 1101 and 1122. The aforementioned software can be arranged in different operational configurations. Thus in one arrangement, encoding of data using the disclosed adaptive marking methods can be performed using the software 1124 on the computer 1122, and decoding of the encoded data can be performed using the software 1127 on the computer 1101 after the encoded data is communicated from the computer 1122 to the computer 1101 over a network 1120. Alternately both the encoding and decoding of data can be performed on one of the aforementioned computers 1122, 1101.

The instructions may be formed as one or more code modules, each for performing one or more particular tasks. The software may also be divided into two separate parts, in which a first part performs the adaptive marking methods and a second part manages a user interface between the first part and the user. The software may be stored in a computer readable medium, including the storage devices described below, for example. The software is loaded into the computer(s) from the computer readable media, and then executed by the computer(s). A computer readable medium having such software or computer program recorded on it is a computer program product. The use of the computer program product in the computer preferably effects an advantageous apparatus for adaptive marking.

The computer system 1100 includes the computer module 1101 and 1122. The remainder of the description directed to FIG. 1 relates primarily to the computer module 1101, however clearly the description applies equivalently to the computer module 1122. The system 1100 also includes input devices such as a keyboard 1102, a scanner 1128 and a mouse 1103, output devices including a printer 1115, a display device 1114 and loudspeakers 1117. A Modulator-Demodulator (Modem) transceiver device 1116 is used by the computer module 1101 for communicating to and from a communications network 1120, for example connectable via a telephone line 1121 or other functional medium. The modem 1116 can be used to establish communications between the computer 1101 and the computer 1122 across the Internet and other network systems such as Local Area Networks (LAN) or Wide Area Networks (WAN), and may be incorporated into the computer module 1101 in some implementations.

The computer module 1101 typically includes at least one processor unit 1105, and a memory unit 1106, for example formed from semiconductor random access memory (RAM) and read only memory (ROM). Similarly the computer module 1122 typically includes at least one processor unit 1123, and a memory unit 1125, for example formed from semiconductor random access memory (RAM) and read only memory (ROM). The module 1101 also includes an number of input/output (I/O) interfaces including an audio-video interface 1107 that couples to the video display 1114 and loudspeakers 1117, an I/O interface 1113 for the keyboard 1102 and mouse 1103 and optionally a joystick (not illustrated), and an interface 1108 for the modem 1116 and printer 1115. In some implementations, the modem 11116 may be incorporated within the computer module 1101, for example within the interface 1108. A storage device 1109 is provided and typically includes a hard disk drive 1110 and a floppy disk drive 1111. A magnetic tape drive (not illustrated) may also be used. A CD-ROM drive 1112 is typically provided as a non-volatile source of data.

The components 1105 to 1113 of the computer module 1101 typically communicate via an interconnected bus 1104 and in a manner which results in a conventional mode of operation of the computer system 1100 known to those in the relevant art. Examples of computers on which the described arrangements can be practised include IBM-PC's and compatibles, Sun Sparcstations or alike computer systems evolved therefrom.

Typically, the adaptive mark software application program is resident on the hard disk drive 1110 and read and controlled in its execution by the processor 1105. Intermediate storage of the program and any data fetched from the network 1120 may be accomplished using the semiconductor memory 1106, possibly in concert with the hard disk drive 1110. In some instances, the application program may be supplied to the user encoded on a CD-ROM or floppy disk and read via the corresponding drive 1112 or 1111, or alternatively may be read by the user from the network 1120 via the modem device 1116. Still further, the software can also be loaded into the computer system 1100 from other computer readable media. The term "computer readable medium" as used herein refers to any storage or transmission medium that participates in providing instructions and/or data to the computer system 1100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1101. Examples of transmission media include radio or infra-red transmission channels as well as a network connection to another computer or networked device, and the Internet or Intranets including e-mail transmissions and information recorded on Websites and the like.

The method of adaptive marking may alternatively be implemented in dedicated hardware such as one or more integrated circuits performing the functions or sub functions of adaptive marking. Such dedicated hardware may include graphic processors, digital signal processors, or one or more microprocessors and associated memories.

One method in which adaptive marks are used to encode information is via their presence or absence in a regular grid. This regular grid is set up such that the presence or absence of a dot at each grid point is used to store data. In one implementation, the presence of a dot at a grid point indicates a binary one (1), and the absence of a dot at the grid point indicates a binary zero (0). A grid with "a" grid points in one dimension, and "b" grid points in another dimension, is thus able to store a×b bits of data. This grid, of dimensions a and b, can then be repeated a number of times on a document on which information is to be encoded. These repeated instances of the grid provide redundancy of data, such that if a bit read from one grid is interpreted incorrectly (i.e. if a one (1) is interpreted as a zero (0), or a zero (0) is interpreted as a one (1)), there are other copies of the same bit on the document. By taking the most common value found for the bit, the correct bit value can generally be recovered. In the disclosed adaptive mark approach, the 'dot' which is either present or absent at each grid point is an adaptive mark.

To encode a piece of data of length a×b bits in the document, the data is expressed in binary form. The bits of the binarised data are then progressively written in a predetermined order (such as horizontally and then vertically in scanline order) into a regular grid of dimensions a and b. An adaptive mark is placed at a grid point if the bit is a binary one (1) and no adaptive mark is placed at a grid point if the bit is a binary zero (0). This regular grid is then incorporated into the document, and other copies of the same grid are also incorporated into the document for redundancy. Because of the redundancy, some areas of the document may be protected from the placement of adaptive marks because of a desire for visual quality.

To decode the information that has been encoded into the document, the grids on the document are first detected and each grid point in each grid is located. Next, a bit is progressively extracted in a predetermined order from each grid point (eg horizontally and then vertically in scanline order) for each grid. If an adaptive mark is found at a particular grid point in most of the grids on the page, then the bit extracted for that grid point is a one (1). If however no adaptive mark is found at a particular grid point in most of the grids on the page, then the bit extracted for that grid point is a zero (0). The original piece of data of length a×b bits is thus obtained. The aforementioned encoding and decoding processes are described in relation to FIGS. 2A and 3 respectively.

Figure 2A:
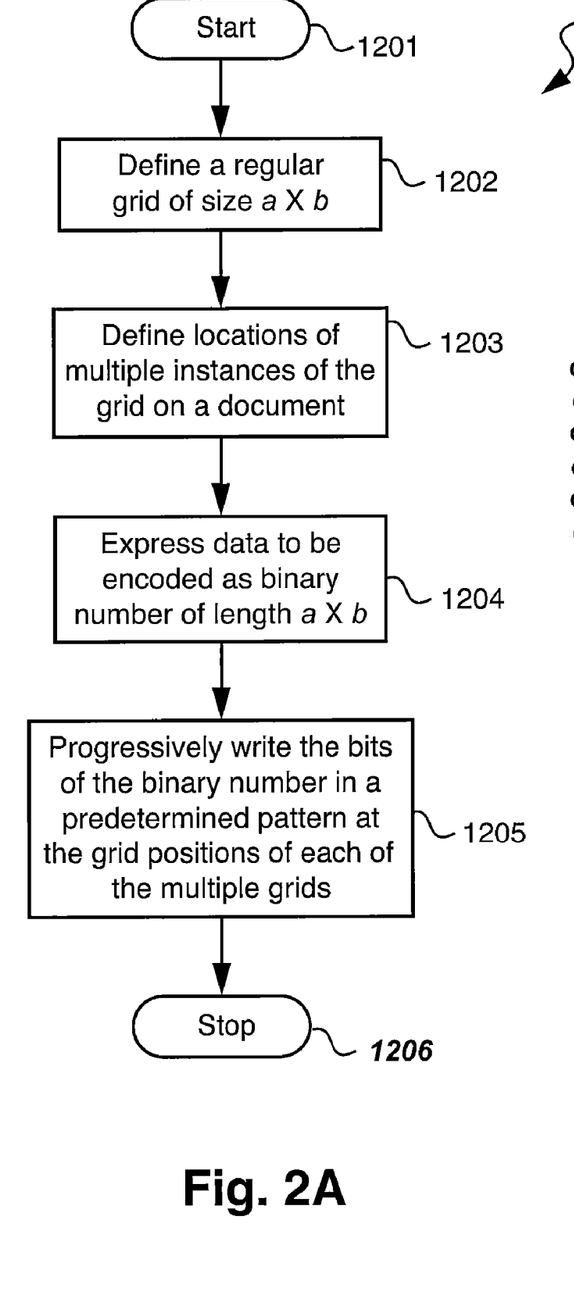
FIG. 2A shows a flow chart of a process for encoding information into a document which can make use of the disclosed adaptive mark approach.

FIG. 2A shows a flow chart of a process 1200, performed by the computer 1122, for encoding information into a document which can make use of the disclosed adaptive mark approach. The encoding process 1200 is performed by the processor 1123 under direction of the adaptive mark software application 1124 on the computer 1122.

The process 1200 commences with a start step 1201 in which the processor 1123 is provided with parameters of the document into which information is to be encoded, and with the information to be encoded into the document. Thereafter in a step 1202 the processor defines a regular grid 1207 of size a×b, seen in FIG. 2B. The example grid 1207 has grid points at positions depicted by a reference numeral 1208. The example grid 1207 is 7 grid points wide and 6 grid points high and can thus accommodate 7×6=42 bits.

Figure 2B:
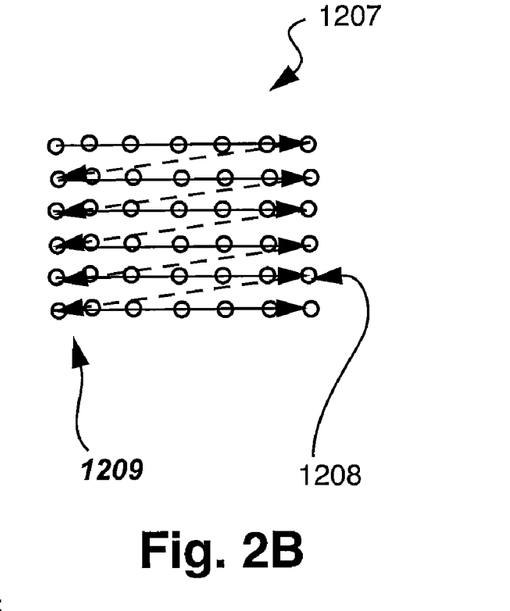
FIG. 2B shows a grid used in the process of FIG. 2A.

In a following step 1203 the processor 1123 determines locations of multiple instances of the grid on the document in question. The step 1203 is subject to constraints as will be described in relation to FIG. 9. In a following step 1204 the processor 1123 expresses the information to be encoded as a binary number of length a×b. Thereafter in a step 1205 the processor progressively writes, as depicted by an exemplary arrow 1209 in relation to the example grid 1207, the bits of the binary number at successive grid points such as 1208 in at least some of the multiple instances of the grid that have been defined in the step 1203. The encoding process 1200 then terminates at a stop step 1206.

Figure 3:
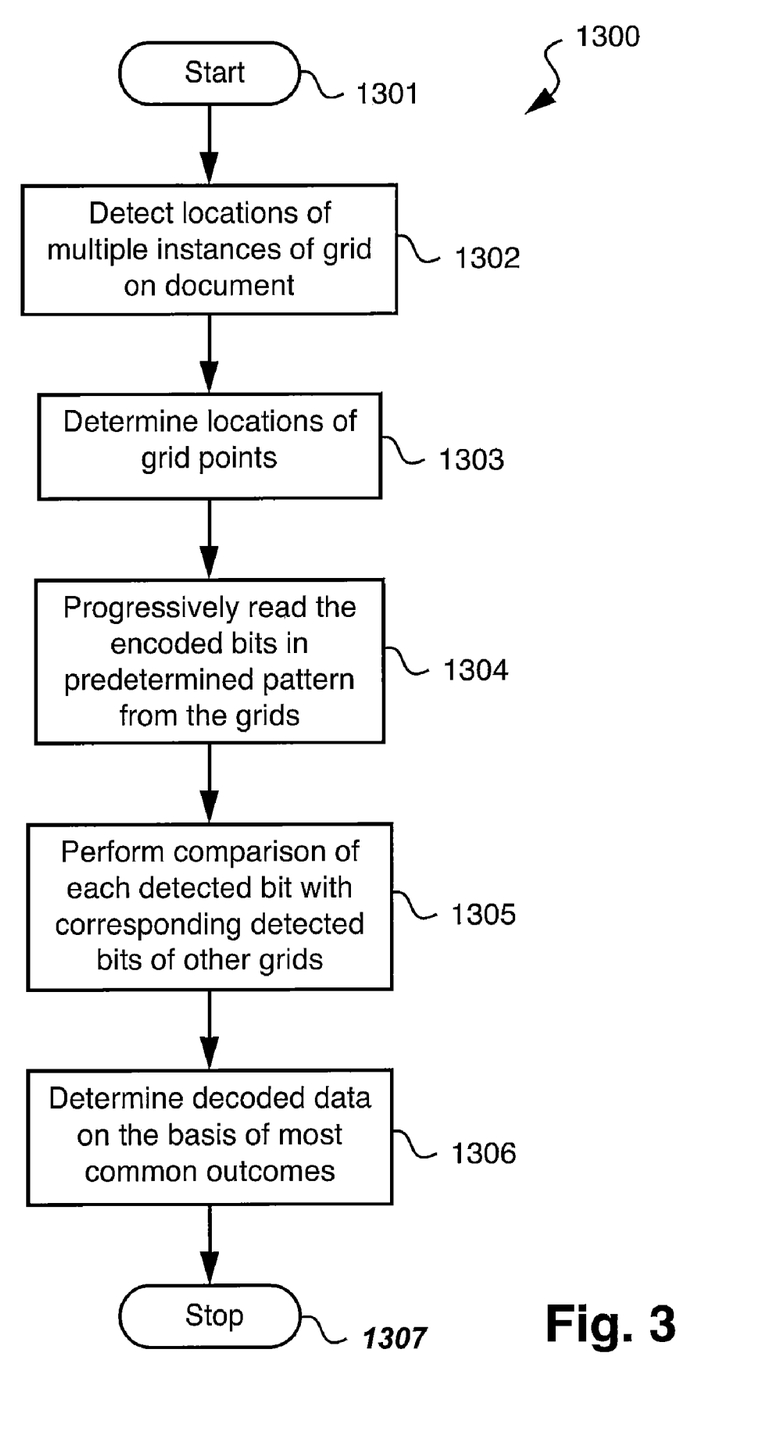
FIG. 3 shows a flow chart of a process for decoding information that has been encoded into a document using the process of FIG. 2.

FIG. 3 shows a flow chart of a process 1300, performed by the computer 1101, for decoding information that has been encoded into a document by the computer 1122 using the process 1200 of FIG. 2A. The process 1300 commences with a start step 1301 at which time the document encoded according to the process 1200 has been communicated over the network 1120 from the computer 1122 to the computer 1101. In a following step 1302 the processor 1105, under the control of the adaptive mark software application 1127, detects locations of the multiple instances of the grid (eg. 1207) that have been incorporated into the received document.

In a following step 1303, the processor 1105 determines the locations of the grid points of the aforementioned grids. In a following step 1304 the processor 1105 progressively reads the encoded information from successive grid points of the grids in a predetermined pattern corresponding to 1209 in FIG. 2B. Thereafter in a step 1305 the processor 1105 performs a comparison of each detected bit from each grid with corresponding bits from corresponding grid positions of the other grids.

In a following step the processor determines valid data for each grid point based upon the most commonly read bit values from each grid point for the plurality of grids, after which the process 1300 terminates in a stop step 1307.

The disclosed adaptive mark technique adaptively chooses the characteristics and the placement of marks steganographically onto printed matter in such a way that the adaptive marks are detectable even on photocopies, but at the same time, the disclosed method can in many cases maintain a high quality of the printed matter.

Figure 4:
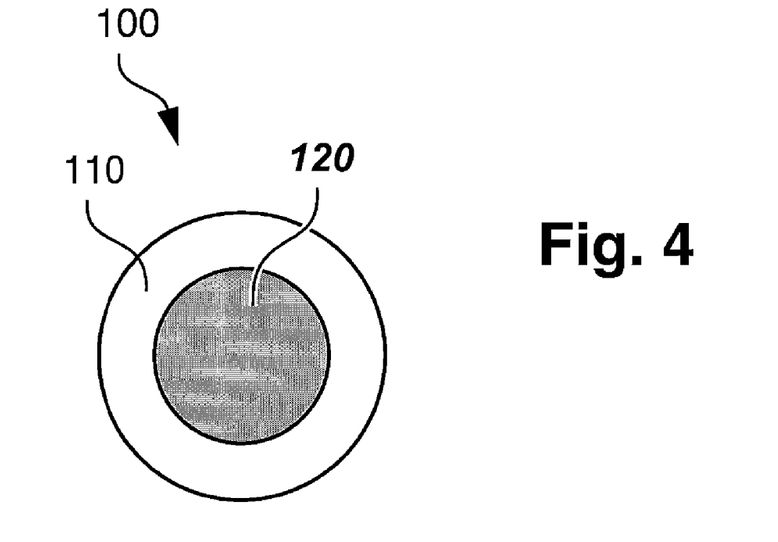
FIG. 4 shows an example of a mark, where each layer can have different colours or patterns.
Figure 5:
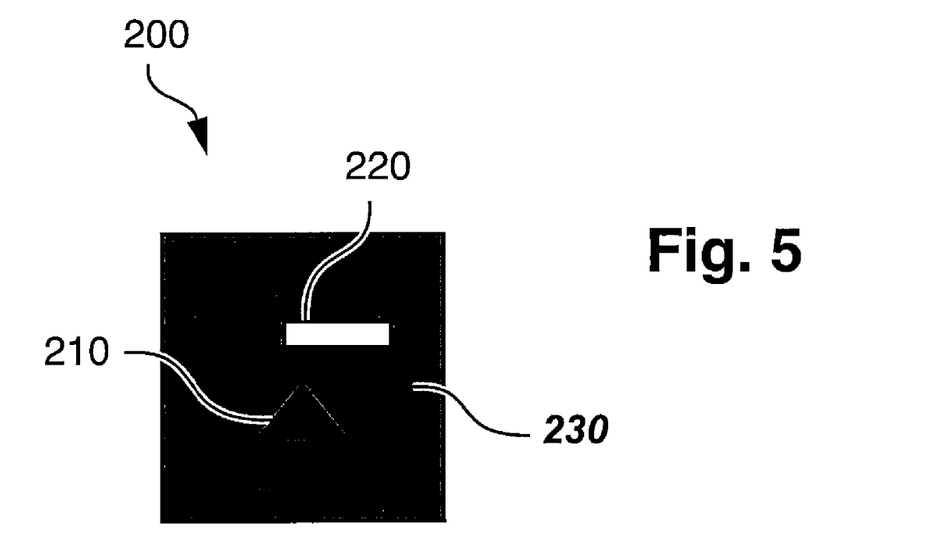
FIG. 5 shows another example of a mark, where each layer can have different colours or patterns.

An adaptive mark consists of a first layer superimposed onto a second layer wherein the second layer consists of a filled geometric shape. The concept of "layers" is introduced to more easily describe the adaptive mark examples, however the printing of adaptive marks may be implemented using other methods. The first layer can be any geometric arrangement of one or more geometric shapes so long as their collective extent is encompassed by the geometric shape in the second layer. The use of two layers enables the design of suitable fill colours, textures or arbitrary images for each layer to enhance detectability of the mark even after photocopying. In FIG. 4, 100 is an example of an adaptive mark which is composed of a filled circle first layer 120 superimposed onto a filled circle second layer 110 of a larger diameter. Similarly, in FIG. 5, 200 is another example of an adaptive mark which is composed of a first layer made up of a filled triangle 210 and a filled rectangle 220, superimposed onto a second layer which is composed of a filled square 230. Depending on the choice of fills, the contrast between the two layers facilitates detection of the adaptive mark, and may allow the adaptive mark to survive photocopying of the encoded document, regardless of the content of the background printed matter. However, when choosing suitable fills, minimising the contrast of the adaptive mark with the background printed matter is taken into consideration in order to minimise the impact on visual quality.

It can be seen that there are many combinations of parameters that result in a correspondingly wide variety of adaptive marks. For example, changing the geometry and fill of one or both layers will result in many possible adaptive marks. Thus, rather than making use of a single type of adaptive mark, a set of suitably designed adaptive marks can be created and used. Decisions can be made as to which mark within the set is chosen to be superimposed onto the printed matter depending on the local characteristics of the printed matter, such that the impact on visual quality is minimised.

Figure 6:
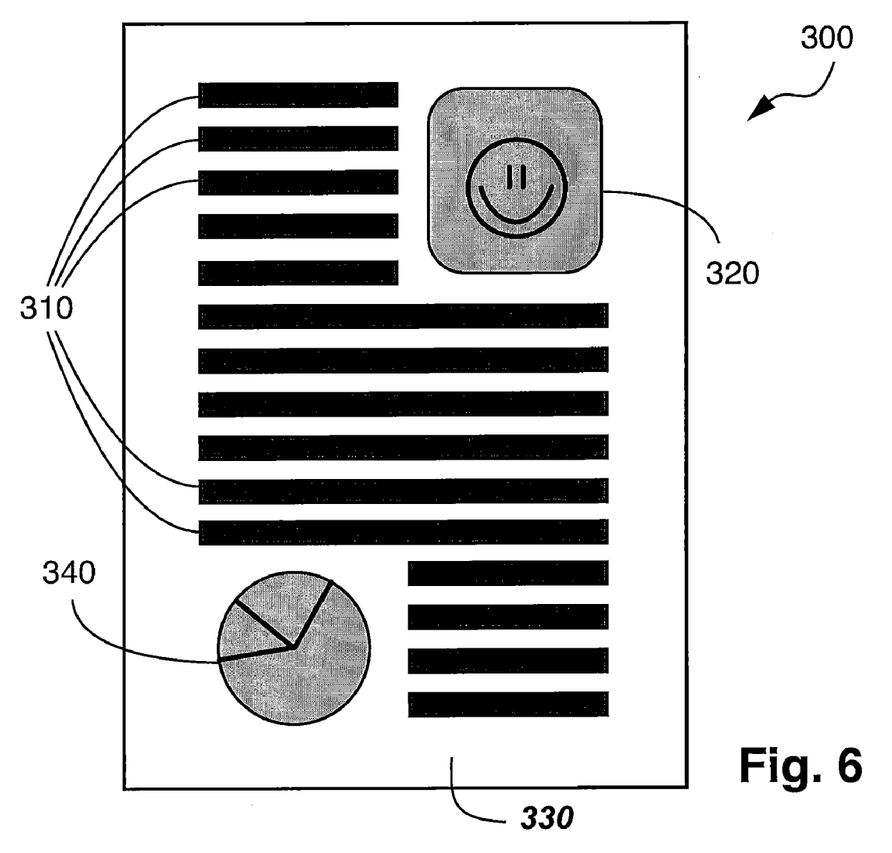
FIG. 6 is an example of a document indicating the type of logical information content in different regions of the printed matter.

To further promote visual quality, whether or not an adaptive mark is to be superimposed at all can be decided based on the logical content of the printed matter at the adaptive mark location under consideration. For example, information regarding the logical content of the information in the document can be divided into categories such as text, photo content, line art, flesh tones, etc. in increasing impact on visual quality when adaptive marks are added. FIG. 6 shows a document 300 which divides the printed matter into logical content categories of white space 330, text 310, images 320 and vector content 340.

There are many ways of obtaining such logical content descriptions of the information in the document. One approach is by considering documents containing printed matter in vector digital format such as Postscript™ or Portable Document Format™. Raster image processing techniques are applied to vector digital formatted documents and in the process, information can be obtained so that the printed matter can be divided into logical content categories such as those described above (in relation to FIG. 6) at pixel level granularity.

Another approach takes the entire document as a raster image and performs whole page analysis on the printed matter. Such analyses may be used to identify skin tones or regions of high noise at pixel level granularity, for example.

Another approach for deriving the logical content information for a document uses meta-data descriptions for the document.

The additional encoded data using adaptive marks is typically not encoded directly as raw data but rather, in a form where controlled redundancy is introduced through the use of error correction codes. When error correction codes are used, the entire encoded steganographic raw data can be fully recovered even when a certain percentage of the encoded adaptive marks are lost. A desired robustness can generally be achieved for the added steganographic encoded data when a certain percentage of the page is encoded. Then, it is possible to decide which categories of logical content of the page are to be encoded with marks and which categories can be skipped, to encode at least the required percentage of the document.

Documents can be partitioned into regions containing corresponding categories of logical content. These regions can be prioritised according to defined (first) criteria, and steganographic data thereby encoded into each of the aforementioned categories according to the priority of the category. The first criterion may be determined according to the region type where the priority is based on the content of the region. The region type is based on the contents of the region and includes vector image, raster image, text or white space. An example of a priority order would be, from high to low priority, white space, vector image, raster image and then text.

Furthermore, the amount, either relative or absolute, of steganographic data per logical content category can also be determined according to defined (second) criteria. This is akin to steganographic density and may vary according to the document resolution or the resolution of a component in which the message information is to be included. The second criterion can also be based on the region type. For example, a raster image may be given a low priority based on the priority of the first criteria. However, if data is to be encoded in to the raster image region the data density would be low. Alternatively the second criterion can be based on the properties of the region such as the density of the text in the region, the line spacing for a text region, the amount of skin tones used in images or the extent of white space in the region. Where the density of the text or the amount of skin tones used in an image is high, the amount of steganographic data can be reduced. Where the amount of white space is high or the line spacing is large, then the amount of steganographic data can be increased.

The term "relative amount of steganographic data per logical content category" refers to the amount of steganographic data to be written into the logical content category in question as a proportion of the total amount of steganographic data to be incorporated into the document. The term "absolute amount of steganographic data per logical content category" refers to the amount of steganographic data to be written into the logical content category in question without reference to the total amount of steganographic data to be incorporated into the document.

Figure 8:
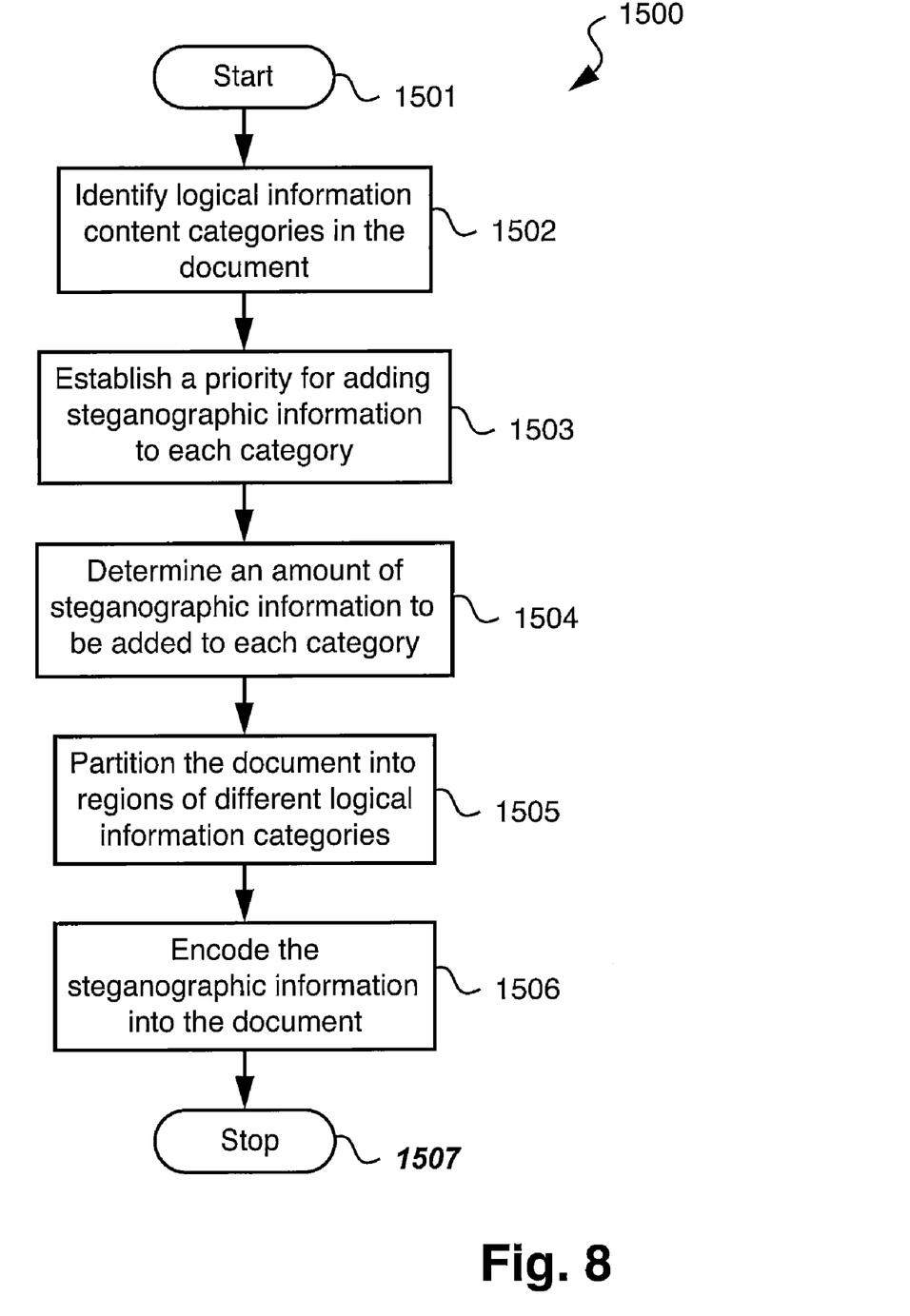
FIG. 8 shows a flow chart of a process for incorporating steganographic data into a document containing known information.

FIG. 8 shows a flow chart of a process 1500 for incorporating steganographic data into a document containing known information. The process commences with a start step 1501 after which in a step 1502 the processor 1105 identifies logical information categories in the document. In another arrangement the various available logical information categories are pre-defined. A following step 1503 establishes a priority according to which steganographic information is to be encoded into each of the aforementioned categories according to a first criterion (eg. the first criteria mentioned above). Thereafter a step 1504 determines how much steganographic information is to be added to each of the aforementioned categories according to a second criterion (eg. the second criteria mentioned above). Subsequently a step 1505 partitions the document into regions each of which comprises information in one of the aforementioned categories. A following step 1506 encodes the steganographic data into each region according to the priorities determined in the step 1503 and the amounts determined in step 1504. The process 1500 then terminates with a step 1507.

Figure 7:
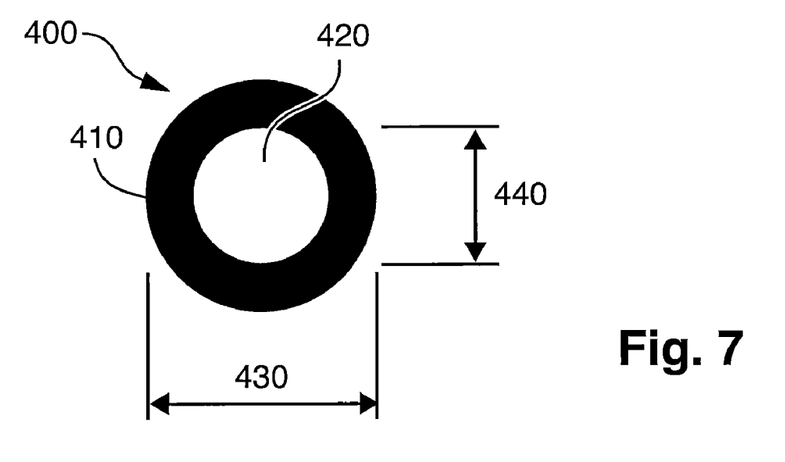
FIG. 7 shows a white mark used in a first arrangement.

In the first arrangement, original documents containing black and white printed matter are considered. A set of two distinct adaptive marks are employed, namely, a white adaptive mark and a black adaptive mark. Referring to FIG. 7, the white adaptive mark is shown in 400 which is made of a first layer consisting of a filled white circle 420 superimposed onto the centre of a second layer consisting of a filled black circle 410 of a diameter larger than that of the white circle, i.e. diameter 430>diameter 440. The corresponding black adaptive mark is the same as the white adaptive mark except with the colours interchanged. Thus, the black adaptive mark contains a black centre circle and the white adaptive mark contains a white centre circle.

The process of the first arrangement for superimposing a single mark will be described below with reference to process 800 in FIG. 9, which starts at a step 810 and ends at a step 880. For the purpose of illustration, it is assumed that the data is encoded by placing adaptive marks located at the centre of cells of a regular grid.

Figure 10:
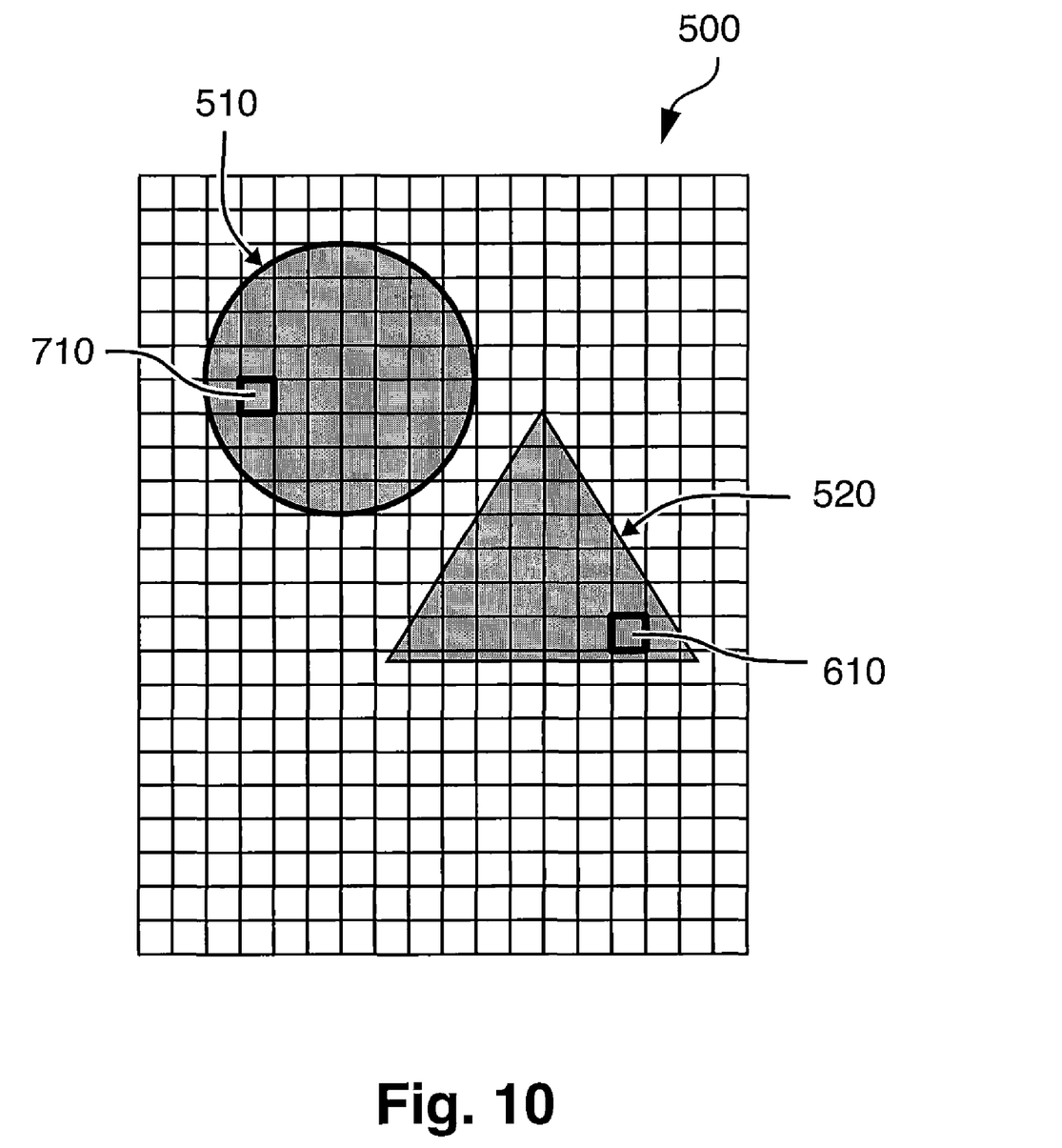
FIG. 10 shows the document divided up into a grid of cells, with regions containing different logical content.

To illustrate, consider FIG. 10 which shows a document 500 where printed matter is divided into logical content categories. Specifically, a circular region 510 indicates vector content and a triangular region 520 contains image content. Furthermore, the page has been divided up into cells on a regular grid of cells.

Returning to FIG. 9, firstly consider a particular adaptive mark location where an adaptive mark is to be placed. Depending on the logical content of the printed matter located in the cell containing the proposed adaptive mark location, as determined by a step 820, a decision is made whether the adaptive mark is actually to be superimposed onto the printed matter or skipped as shown in a following decision 830. If the adaptive mark is to be skipped, then the process 800 follows a YES arrow and ends at a step 880.

As an example, if it is decided that all image contents are to be skipped for mark encoding, then only regions of white space and regions of vector content within the circle 510 will be encoded. Although this results in the loss of encoding marks in some regions of the document 500, in many instances the additional (redundant) encoded data will have sufficient redundancy to remain robust against this loss.

Figure 9:
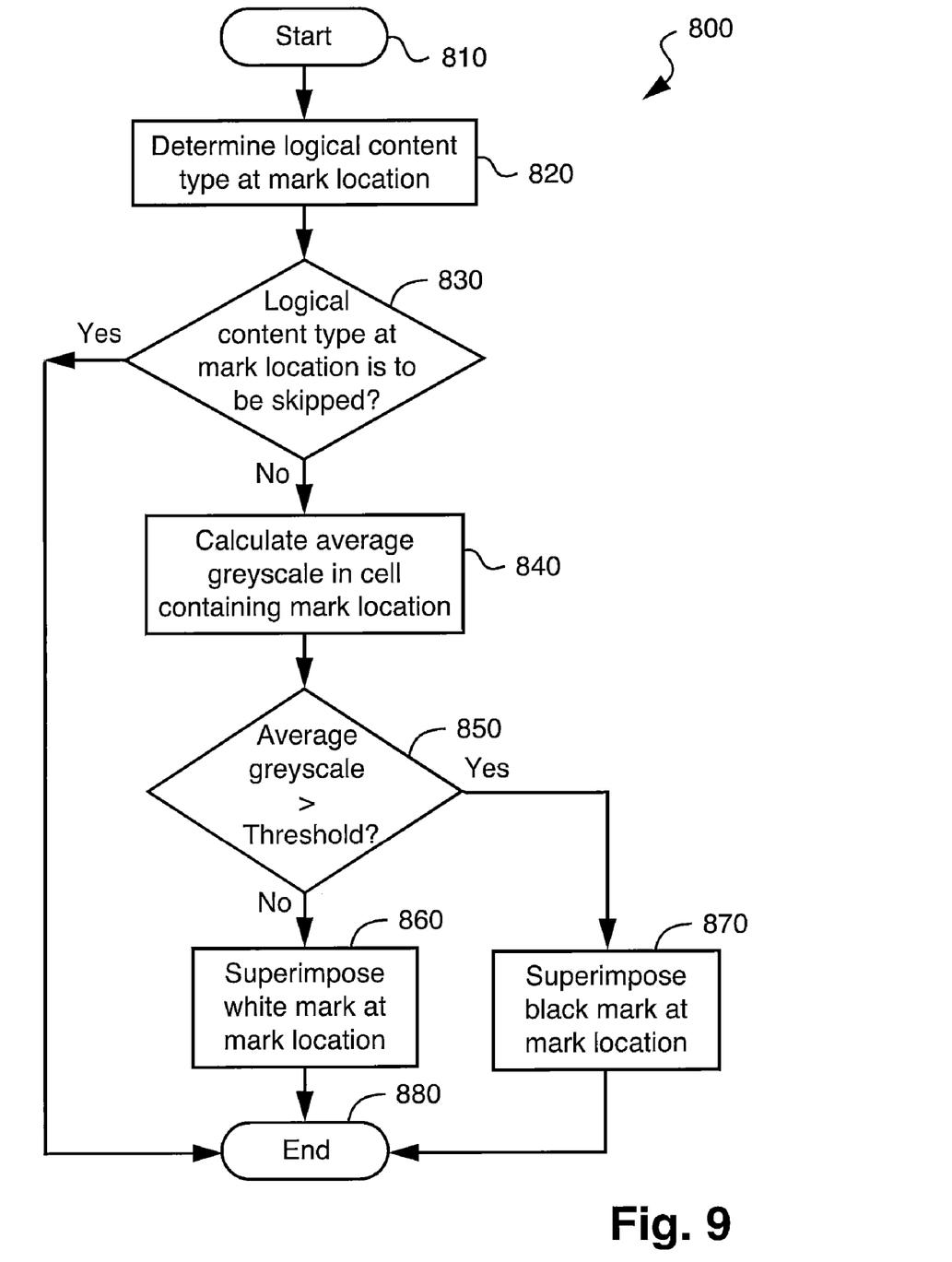
FIG. 9 is a flowchart illustrating the mark placement process involved in the first arrangement.

Once the decision to superimpose a dot is made in the step 830, a following step 840 in FIG. 9 is executed and a greyscale digital image representation of the original document is obtained. From this digital image, the local average greyscale value around the location where a mark is to be placed is determined. For example, if the data is encoded by placing marks located at the centre of cells of a regular grid, the average greyscale value for a given mark location could be calculated by finding the average greyscale value within the cell containing the mark location. These values are recorded in a greyscale map.

Figure 11:
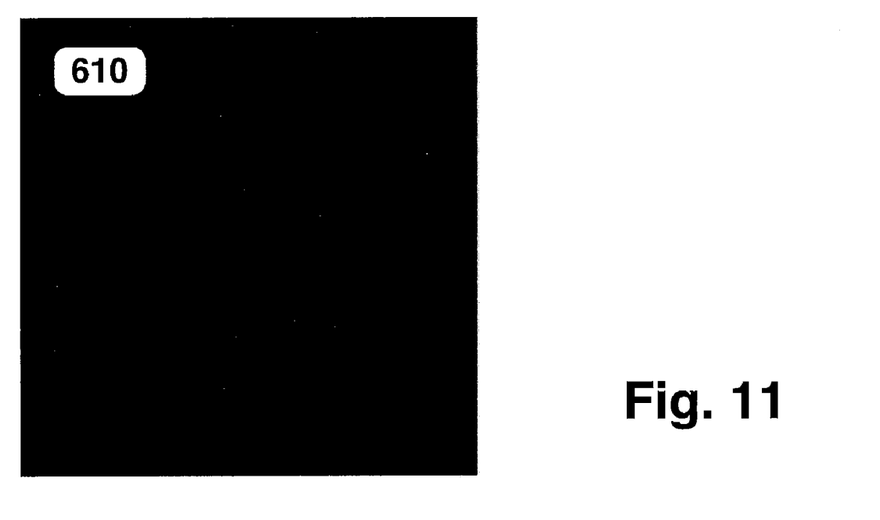
FIG. 11 shows a cell as described in the first arrangement, where the cell is located in image content.

Consider a cell 610 which is highlighted by a bold perimeter in FIG. 10 and magnified in FIG. 11. When an adaptive mark is superimposed onto the printed matter of this cell, the average greyscale value of the cell is obtained and compared to a threshold. This is depicted by the step 840 and the decision step 850 in FIG. 9. If the greyscale value is less than the threshold, then the background is considered dark coloured and so the process 800 follows a NO arrow and a white mark is added as shown in a step 860. Otherwise, the background is considered light coloured and so the process 800 follows a YES arrow and a black mark is added instead, as shown in process 870.

Figure 12:
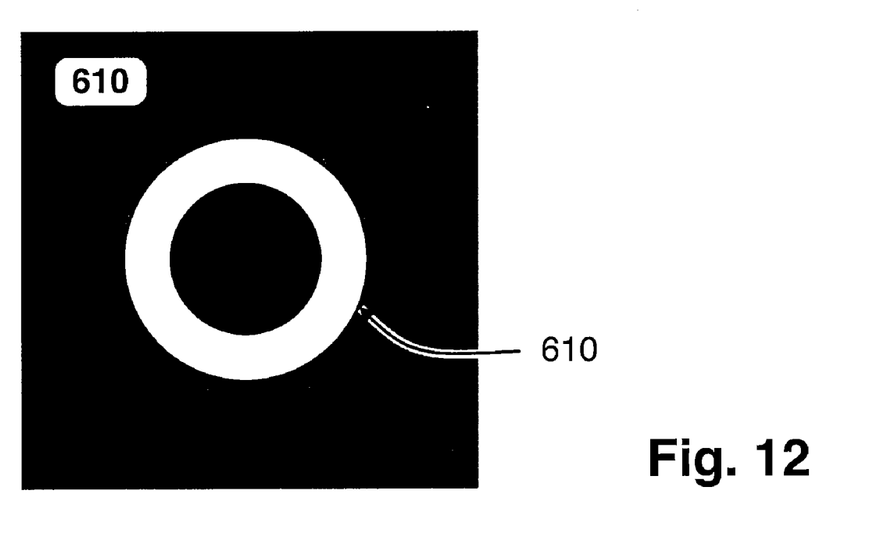
FIG. 12 shows a black mark placed in the centre of the cell indicated in FIG. 11.
Figure 13:
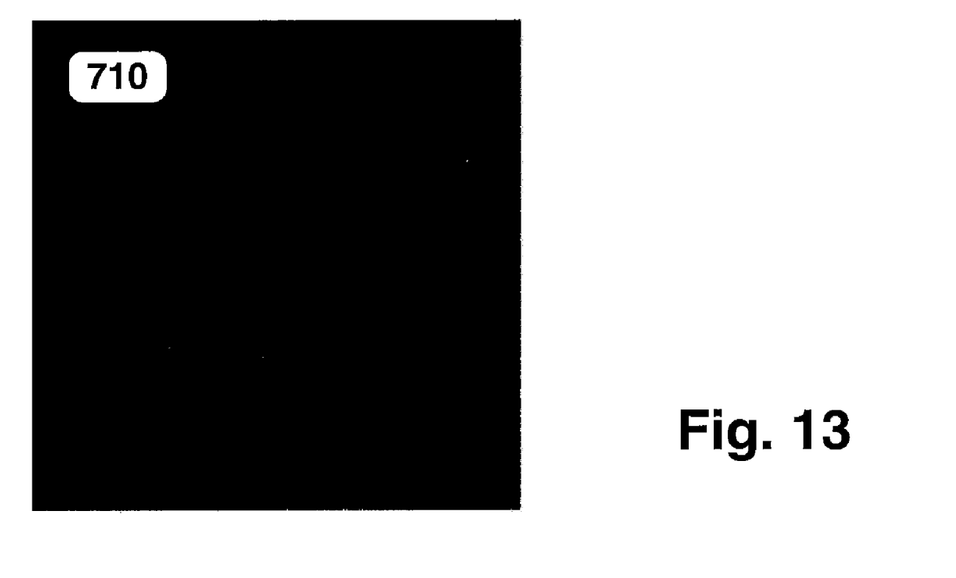
FIG. 13 contains another cell described in the first arrangement, where the cell is located in vector content.
Figure 14:
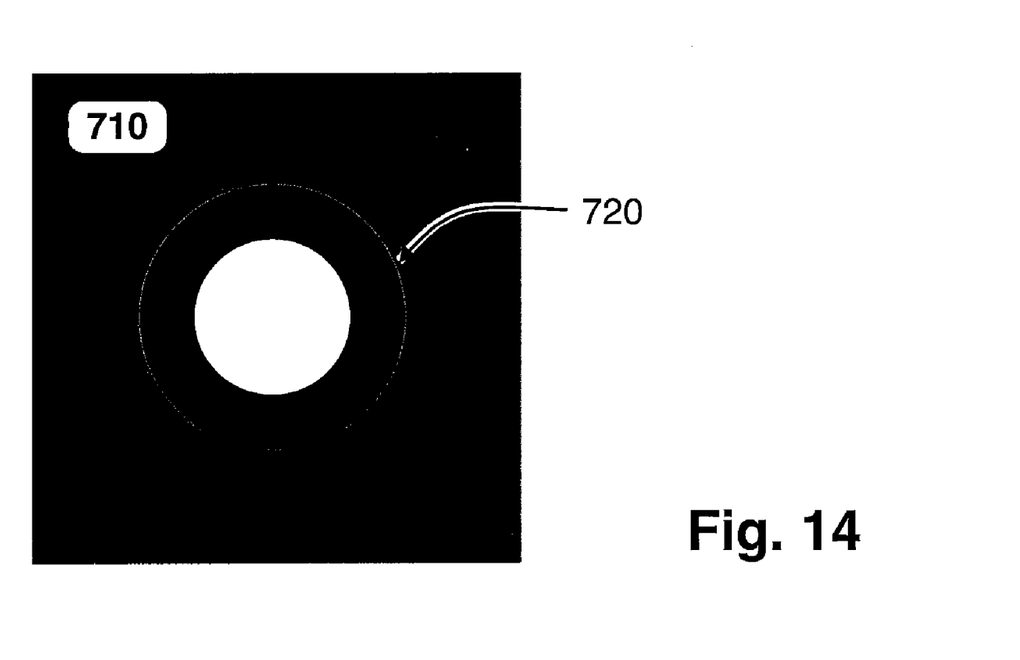
FIG. 14 shows a white mark placed in the centre of the cell indicated in FIG. 13.

For example, assuming that the average greyscale value of cell 610 in FIG. 10 and FIG. 11 is greater than the threshold, then a black mark 620 is chosen to be placed in the centre of the cell, as shown in FIG. 12. Similarly, assuming that the average greyscale value of cell 710 in FIG. 10 and FIG. 13 is less than the threshold, then a white mark 720 is chosen to be placed in the centre of the cell, as shown in FIG. 14. Referring to a mark 400 in FIG. 7, the optimal approach uses a black mark which has diameter 430 of 11 pixels and diameter 440 of 5 pixels, both at a resolution of 600 dpi. The white mark has diameter 430 of 11 pixels and diameter 440 of 8 pixels, both at resolution of 600 dpi.

It is clear that this approach exemplified by the process 800 in FIG. 9 can be extended to colour documents. In a second arrangement, one such approach is described as follows. The essence of this second arrangement is the same as that of the previous first arrangement so the details that are similar will not be repeated. The main difference is rather than obtaining a greyscale digital image representation of the original document in the step 840, a colour digital image representation is obtained and stored in the well known "Lab" colour space. The local average "ab" value around the location where a mark is to be placed is determined. Having obtained this average ab value, the first layer is filled with a colour which has the same ab value but a higher L value. The second layer is filled with a colour which also has the same ab value but a lower L value. Thus, contrast within the mark is maximised whilst contrast with the background printed matter is minimised.

Figure 15:
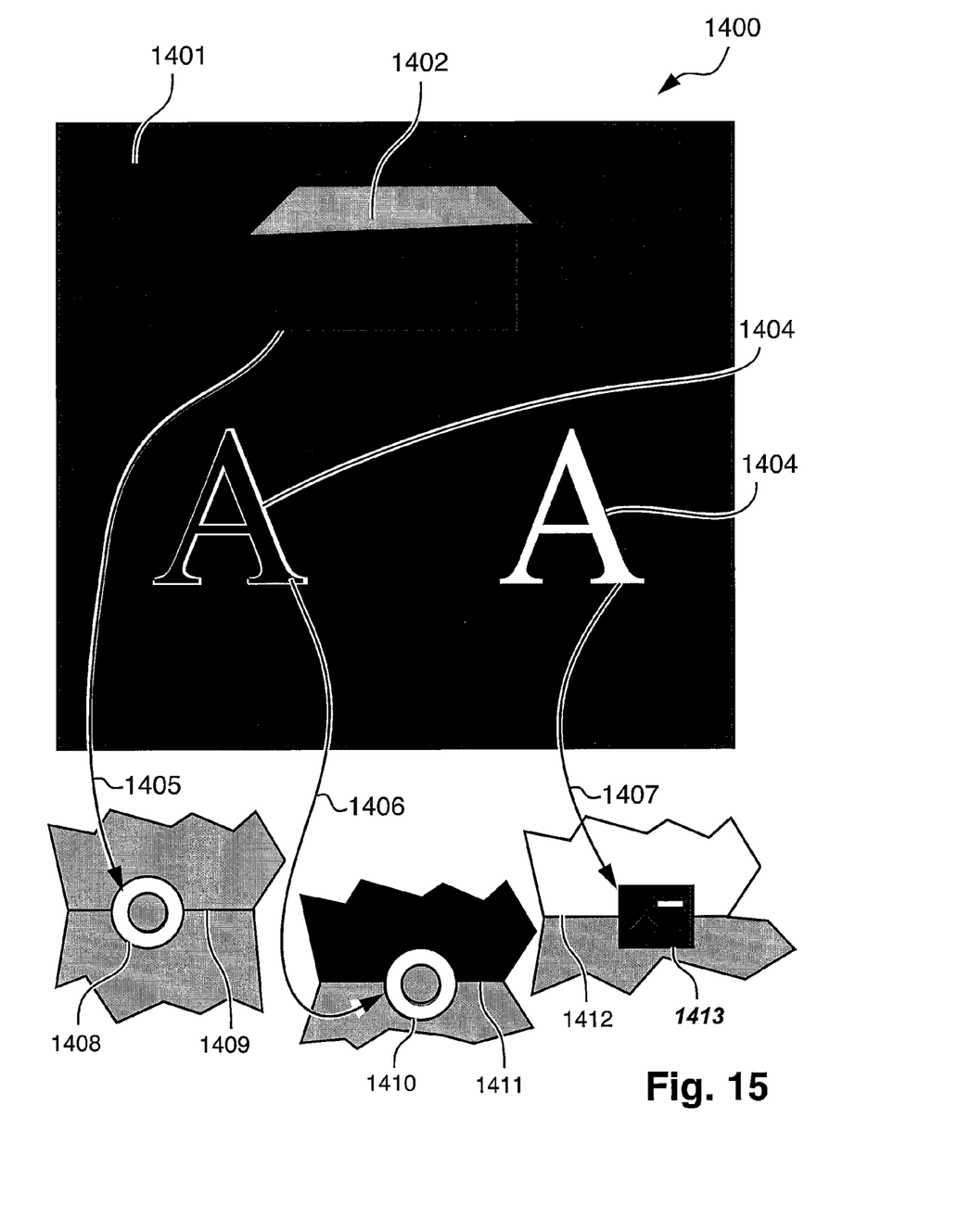
FIG. 15 shows how the adaptive marks of FIGS. 4 and 5 are incorporated as steganographic information into a document having known information.

FIG. 15 shows how the adaptive marks of FIGS. 4 and 5 are incorporated as steganographic information into a document 1400 having known information. The document 1400 has known information in the form of a background 1401, a shape 1402, a black coloured letter 1403 and a white coloured letter 1404. An adaptive mark in the form of a dot at a boundary of the shape 1402 is depicted by an arrow 1405 in enlarged form. A fragment 1409 of the background 1401 has superimposed thereon an adaptive dot 1408 of the form shown in FIG. 4. An adaptive mark in the form of a dot at a boundary of the black coloured letter 1403 is depicted by an arrow 1406 in enlarged form. A fragment 1411 of the dark coloured letter 1403 has superimposed thereon an adaptive dot 1410 of the form shown in FIG. 4. An adaptive mark in the form of a dot at a boundary of the white coloured letter 1404 is depicted by an arrow 1407 in enlarged form. A fragment 1412 of the white coloured letter 1404 has superimposed thereon an adaptive dot 1413 of the form shown in FIG. 5.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

[Delete this as it is not for Australia]
In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of encoding a message comprising a plurality of bits into a document, the document containing known information, the method comprising the steps of:
   identifying a plurality of logical information content categories associated with the known information;
   establishing a priority order of the categories in which the message is to be encoded in each of the categories;
   determining an amount of the message to be encoded in each of the categories based upon the established priority order; and
   encoding the message into the document for each identified category and the corresponding determined amount of the message by:
   selecting a plurality of adaptive marks from a set of predefined adaptive marks, the selection being based upon a characteristic of the known information around a location where the selected adaptive marks are to be used, to maximize contrast between a first part of the selected adaptive marks and a second part of the selected adaptive marks and to minimize contrast between the selected adaptive marks and the known information around the location; and
   incorporating at least one selected adaptive mark into the document in accordance with bits of the corresponding determined amount of the message.

2. A method according to claim 1, wherein the characteristic is a local average greyscale value around a location at which the selected adaptive mark is to be placed.

3. A method according to claim 1, wherein said establishing step is performed based upon a first criterion and said determining step is performed based upon a second criterion, the first and second criteria being dependent upon the expected impact of the encoding method on the visible quality of the encoded document.

4. A method according to claim 1, comprising a further step of:
   partitioning the document into regions of the different logical information content categories, wherein said partitioning step comprises at least one of the steps of:
   performing raster image processing of the document to establish the regions of the different logical information content categories; and
   processing meta-data associated with the document to establish the regions of the different logical information content categories.

5. A method according to claim 4, wherein the logical information content categories comprise at least white space, text, images, and vector content.

6. A method according to claim 4, wherein said encoding step comprises the steps of:
   constructing, dependent upon the known information in the document, at least one adaptive mark as a symbol with which to encode the message; and
   encoding the message into the document using instances of the at least one adaptive mark.

7. A method according to claim 4, wherein said encoding step comprises, in regard to a region corresponding to one of the logical information content categories, the steps of:
   segmenting the region into visually contrasting sub-regions;
   constructing, dependent upon visual attributes of the visually contrasting sub-regions, a plurality of adaptive marks as symbols with which to encode the message, wherein each of the plurality of adaptive marks is visually contrasting with at least one of the visually contrasting sub-regions; and
   encoding the message into the region corresponding to the one of the logical information content categories by incorporating instances of the plurality of adaptive marks into the sub-regions in a manner that maintains the visual contrast between each sub-region and each corresponding adaptive mark.

8. A method according to claim 7, wherein each of the plurality of adaptive marks comprises at least a first geometric shape falling within a boundary of a second geometric shape, wherein:
   the first geometric shape and the second geometric shape are visually contrasting.

9. A method according to claim 7, wherein each of the plurality of adaptive marks comprises a plurality of first geometric shapes falling within a boundary of a second geometric shape, wherein:
   the plurality of first geometric shapes and the second geometric shape are visually contrasting.

10. An apparatus for encoding a message comprising a plurality of bits into a document containing known information, the apparatus comprising:
    a memory for storing a program; and
    a processor for executing the program, said program comprising:
    code for identifying a plurality of logical information content categories associated with the known information;
    code for establishing a priority order in which the message is to be encoded in each of the categories;
    code for determining an amount of the message to be encoded in each of the categories based on the established priority order; and
    code for encoding the message into the document, for each identified category and the corresponding determined amount of the message, by;
    selecting a plurality of adaptive marks from a set of predefined adaptive marks, the selection being based upon a characteristic of the known information around a location where the selected adaptive marks are to be used, to maximize contrast between a first part of the selected adaptive marks and a second part of the selected adaptive marks and to minimize contrast between the selected adaptive marks and the known information around the location; and
    incorporating at least one selected adaptive mark into the document in accordance with bits of the corresponding determined amount of the message.

11. An apparatus according to claim 10, further comprising code for partitioning the document into regions corresponding to the different logical information content categories; and
    wherein the code for encoding comprises:
    code for segmenting the regions into visually contrasting sub-regions;
    code for constructing, dependent upon visual attributes of the visually contrasting sub-regions, a plurality of adaptive marks as symbols with which to encode the message, wherein each of the plurality of adaptive marks is visually contrasting with at least one of the visually contrasting sub-regions; and
    code for encoding the message into the regions corresponding to the different logical information content categories by incorporating instances of the plurality of adaptive marks into the sub-regions to maintain the visual contrast between each sub-region and each corresponding adaptive mark.

12. An apparatus according to claim 11, wherein each of the plurality of adaptive marks comprises a plurality of first geometric shapes falling within a boundary of a second geometric shape, wherein:
  the plurality of first geometric shapes and the second geometric shape are visually contrasting.

13. A non-transitory computer readable storage medium having recorded thereon a computer program for directing a processor to execute a method for encoding a message comprising a plurality of bits into a document containing known information, said program comprising:
  code for identifying a plurality of logical information content categories associated with the known information;
  code for establishing a priority order of the categories in which the message is to be encoded in each of the categories;
  code for determining an amount of the message to be encoded in each of the categories based upon the established priority order; and
  code for encoding the message into the document for each identified category and the corresponding determined amount of the message, by:
  selecting a plurality of adaptive marks from a set of predefined adaptive marks, the selection being based upon a characteristic of the known information around a location where the selected adaptive marks are to be used, to maximize contrast between a first part of the selected adaptive marks and a second part of the selected adaptive marks and to minimize contrast between the selected adaptive marks and the known information around the location; and
  incorporating at least one selected adaptive mark into the document in accordance with bits of the corresponding determined amount of the message.

14. A non-transitory computer readable storage medium according to claim 13, further comprising code for partitioning the document into regions corresponding to the different logical information content categories; and
  wherein the code for encoding comprises:
    code for segmenting the regions into visually contrasting sub-regions;
    code for constructing, dependent upon visual attributes of the visually contrasting sub-regions, a plurality of adaptive marks as symbols with which to encode the message, wherein each of the plurality of adaptive marks is visually contrasting with at least one of the visually contrasting sub-regions; and
    code for encoding the message into the regions corresponding to the logical information content categories by incorporating instances of the plurality of adaptive marks into the sub-regions to maintain the visual contrast between each sub-region and each corresponding adaptive mark.

15. A non-transitory computer readable storage medium according to claim 14, wherein each of the plurality of adaptive marks comprises a plurality of first geometric shapes falling within a boundary of a second geometric shape, wherein:
  the plurality of first geometric shapes and the second geometric shape are visually contrasting.

16. A method of adaptively choosing encoding marks to superimpose onto the face of a document, the method comprising the steps of:
  (a) determining characteristics of a digital image representation of the document in a vicinity of where encoding marks are to be placed on the document; and
  (b) selecting, using the determined characteristics, encoding marks from a set of predefined marks to maximize contrast between a first part of the selected encoding marks and a second part of the selected encoding marks and to minimize contrast between the selected encoding marks and the document in the vicinity of where the encoding marks will be placed, based on information obtained in said determining step.

17. The method in claim 16, wherein said determining step uses raster image processing on a vector digital formatted image representation to determine the logical content of printed matter of the document.

18. The method in claim 16, wherein said determining step uses full page analysis of a raster image of the document to determine characteristics and logical content of printed matter of the document.

19. The method in claim 16, wherein said determining step uses a greyscale digital image representation of the document.

20. The method in claim 16, wherein the set of predefined marks comprises marks having a first layer superimposed onto a second layer comprising a filled geometric shape, where the first layer comprises a geometric arrangement of one or more filled geometric shapes in which the collective extent of the geometric shapes is encompassed by the second layer.

21. The method in claim 16, wherein the vicinity of a mark comprises a region of a cell of a regular grid which divides the document, where the cell contains the location of the mark to be superimposed.

22. The method in claim 16, wherein the selection of the encoding marks to superimpose is based on maximizing contrast within the selected encoding marks and minimizing contrast between the selected encoding marks and the document in the vicinity of where the marks are to be placed.

23. A method according to claim 1, wherein the selected adaptive marks are selected to maximize contrast within the selected adaptive marks relative to the known information and to minimize contrast between the selected adaptive marks and the known information around the location.

* * * * *